United States Patent
Ghabra et al.

(10) Patent No.: US 6,873,247 B2
(45) Date of Patent: Mar. 29, 2005

(54) COMBINED VEHICLE IMMOBILIZING AND STEERING COLUMN CONTROL SYSTEM

(75) Inventors: Riad Ghabra, Dearborn Heights, MI (US); Scott Campbell, Livonia, MI (US); Tom Tang, Novi, MI (US); John Nantz, Brighton, MI (US); Calvin Modawell, Troy, MI (US)

(73) Assignee: Lear Corporation, Southfield, MI (US)

( * ) Notice: Subject to any disclaimer, the term of this patent is extended or adjusted under 35 U.S.C. 154(b) by 190 days.

(21) Appl. No.: 10/281,004

(22) Filed: Oct. 25, 2002

(65) Prior Publication Data

US 2004/0080398 A1 Apr. 29, 2004

(51) Int. Cl.⁷ .............................................. G05B 19/00
(52) U.S. Cl. ...................................... 340/5.31; 340/10.1
(58) Field of Search ........................ 340/5.31, 825.72, 340/825.31, 825.34, 825.69, 5.2, 5.26, 815.4; 307/10.5, 10.3; 343/788, 713, 728; 701/1, 29

(56) References Cited

U.S. PATENT DOCUMENTS

| | | | |
|---|---|---|---|
| 4,628,310 A | * 12/1986 | Reighard et al. | ...... 340/825.72 |
| 5,041,817 A | 8/1991 | Reeb | |
| 5,561,420 A | 10/1996 | Kleefeldt et al. | |
| 5,724,028 A | 3/1998 | Prokup | |
| 5,869,908 A | * 2/1999 | Moczygemba et al. | .... 307/10.5 |
| 5,906,392 A | 5/1999 | Reid et al. | |
| 5,934,704 A | 8/1999 | Hansen et al. | |
| 5,990,574 A | 11/1999 | Lecznar et al. | |
| 6,012,736 A | 1/2000 | Hansen et al. | |
| 6,091,779 A | 7/2000 | Griessbach | |
| 6,169,339 B1 | 1/2001 | Cripe | |
| 6,188,140 B1 | 2/2001 | Kito et al. | |
| 6,259,168 B1 | * 7/2001 | Okada | ...................... 307/10.5 |
| 6,343,670 B1 | 2/2002 | Mindl et al. | |
| 6,469,616 B1 | * 10/2002 | Lindner et al. | ............ 340/5.26 |
| 6,563,474 B2 | * 5/2003 | Nantz et al. | ................. 343/788 |
| 2001/0000432 A1 | 4/2001 | Farley et al. | |

* cited by examiner

Primary Examiner—Michael Horabik
Assistant Examiner—William Bangachon
(74) Attorney, Agent, or Firm—Bill C. Panagos

(57) ABSTRACT

A combined immobilizing and steering column control system for a vehicle includes a device, a steering wheel, and a vehicle immobilizing system. The device has a transponder for transmitting an identification signal. The steering wheel includes controls and a first inductor. The first inductor transmits a control signal for controlling a vehicle function in response to a corresponding steering wheel control being actuated. The immobilizing system has a second inductor and a controller. The second inductor is operable to sense the identification signal transmitted by the transponder and to sense a control signal transmitted by the first inductor. The controller performs a vehicle immobilizing function in response to the second inductor sensing an identification signal transmitted by the transponder. The controller enables the vehicle function corresponding to an actuated steering wheel control in response to the second inductor sensing the corresponding control signal transmitted by the first inductor.

15 Claims, 2 Drawing Sheets

US 6,873,247 B2

COMBINED VEHICLE IMMOBILIZING AND STEERING COLUMN CONTROL SYSTEM

BACKGROUND OF THE INVENTION

1. Field of the Invention

The present invention relates to a combined vehicle immobilizing and steering column control system.

2. Background Art

A vehicle engine is typically started by inserting an ignition key into an ignition lock cylinder and then turning the ignition key. In order to prevent unauthorized use of a vehicle, an electronic immobilizing system is employed with the vehicle's ignition system. The immobilizing system uses an inductive link between a transmitter contained in the ignition key and a coil placed around the ignition lock cylinder. The transmitter contained in the key transmits an immobilizing identification code. When the identification code transmitted from the transmitter of the key matches an identification code preset in the vehicle's engine control unit, the engine is electronically controlled and started. Therefore, the starting of the engine is permitted only by a key incorporating a transmitter which transmits the proper identification code.

A vehicle steering column includes a steering wheel rotatably connected to a steering wheel shaft. The steering wheel typically includes control buttons and switches which are actuated by an operator to control certain vehicle functions. Such steering wheel control buttons and switches are hard wired to respective control modules via the steering wheel shaft. A problem with such an arrangement is that it would be more desirable if the steering wheel control buttons and switches communicated wirelessly with the respective modules.

SUMMARY OF THE INVENTION

Accordingly, it is an object of the present invention to provide a combined vehicle immobilizing and steering column control system.

In carrying out the above object and other objects, the present invention provides a combined immobilizing and steering column control system for a vehicle. The system includes a device having a transponder for transmitting an identification signal. The system further includes a steering wheel and a vehicle immobilizing system. The steering wheel includes controls such as buttons and switches and a first inductor such as a coil. The first inductor transmits a control signal for controlling a vehicle function in response to a corresponding steering wheel control being actuated. The vehicle immobilizing system has a second inductor such as a coil and a controller. The second inductor is operable to sense the identification signal transmitted by the transponder and to sense a control signal transmitted by the first inductor. The controller performs a vehicle immobilizing function in response to the second inductor sensing an identification signal transmitted by the transponder. The controller enables the vehicle function corresponding to an actuated steering wheel control in response to the second inductor sensing the corresponding control signal transmitted by the first inductor.

The device may be an ignition key, a passive entry device, a remote keyless entry device, a keyless ignition fob, and the like. The combined system may further include a fixed steering shaft with the second inductor being positioned on the fixed steering shaft. In the case of the device being an ignition key, the combined system may further include a lock cylinder for receiving the ignition key with the lock cylinder being positioned adjacent to the second inductor in order to enable the second inductor to sense the identification code transmitted by the transponder when the ignition key is inserted into the lock cylinder.

The steering wheel further may include a rechargeable power source for providing power to the steering wheel controls. Such a power source may be a capacitor or a battery.

The device may further include a receiver for receiving signals transmitted by the vehicle immobilizing system via the second inductor.

The vehicle immobilizing system may further include a transmitter connected to the controller to enable the controller to wirelessly transmit wake-up signals to the device. In this case, the vehicle immobilizing system may further include a transceiver connected to the controller to enable the controller to wirelessly receive and transmit authentication signals with the device, wherein upon authentication the controller enables a corresponding vehicle function.

The vehicle immobilizing system may further include a receiver connected to the controller to enable the controller to wirelessly receive remote keyless entry signals transmitted by the device. Upon authentication of a received remote keyless entry signal the controller enables a corresponding vehicle function.

The vehicle immobilizing system may further include a receiver connected to the controller to enable the controller to wirelessly receive remote tire pressure monitoring signals transmitted by a tire sensor. The controller enables an alarm in response to a tire pressure monitoring signal being indicative of low tire pressure.

The device may be operable for transmitting a passive go signal as part of backup functionality for a passive go application upon the device having a dead battery. In this instance, the second inductor of the vehicle immobilizing system is operable for sensing the passive go signal transmitted by the device. The controller performs a vehicle immobilizing function in response to the second inductor sensing the passive go signal. The second inductor may sense the passive go signal from the device as the device is moved in proximate relation to the second inductor.

The device may also be operable for transmitting a keyless ignition system signal. In this instance, the second inductor of the vehicle immobilizing system is operable for sensing the keyless ignition system signal transmitted by the device. The controller performs a vehicle immobilizing function in response to the second inductor sensing the keyless ignition system signal.

DETAILED DESCRIPTION OF THE PREFERRED EMBODIMENT(S)

Figure 1:
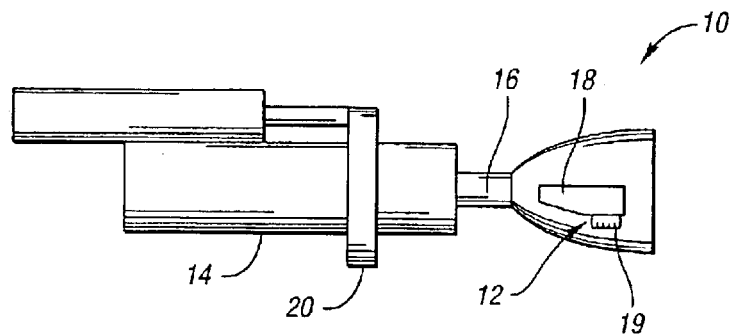
FIG. 1 illustrates a schematic representation of a vehicle immobilizing system in accordance with the present invention.

Referring now to FIG. 1, a schematic representation of a vehicle immobilizing system 10 in accordance with the present invention is shown. Immobilizing system 10 includes a portable electronic key 12 on the operator's side and an ignition lock cylinder 14 on the vehicle's side. Ignition key 12 has a mechanical bit 16 which can be inserted into an associated receptacle of lock cylinder 14. In order to activate the immobilizing function, key 12 includes a transceiver having a transponder 18 in which an identification code is stored in read out form, and, on the vehicle side, an inductive base station coil 20. Inductive coil 20 is arranged around lock cylinder 14 and is connected to a controller arranged in the vehicle (not shown in FIG. 1).

The insertion and turning of key 12 in lock cylinder 14 triggers an inductive data transmission process in which transponder 18 transmits the identification code. Transponder 18 uses an inductive coil 19 to transmit the identification code. Coil 20 receives and provides the transmitted identification code to the controller. The controller checks the identification code to determine whether the identification code is authorized for the vehicle. If the identification code is recognized as being authorized, the controller deactivates the immobilizing function. After the immobilizing function is deactivated, the engine can be started and run.

Figure 2:
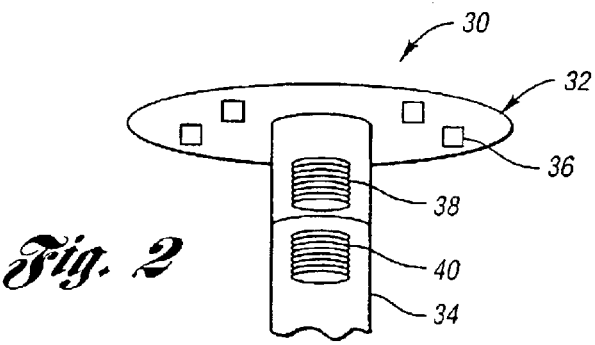
FIG. 2 illustrates a schematic representation of a steering column control system in accordance with the present invention.

Referring now to FIG. 2, a schematic representation of a steering column control system 30 in accordance with the present invention is shown. Steering column control system 30 includes a steering wheel 32 rotatably connected to a fixed steering column 34. Steering wheel 32 includes a plurality of steering wheel control buttons and switches ("buttons") 36. Steering wheel 32 further includes an inductive coil 38 associated with steering wheel control buttons 36. Inductive coil 38 is fixed to a lower portion of steering wheel 32.

Steering column 34 includes an inductive coil 40 associated with a controller (not shown in FIG. 2). Coils 38 and 40 provide an inductive link between steering wheel control buttons 36 and the associated controller. As such, coils 38 and 40 enable a contactless setup between steering wheel control buttons 36 and the controller. Thus, it is possible to communicate the status of steering wheel control buttons 36 to the controller using a contactless setup. Such a configuration effectively provides a wireless clock spring.

In response to an operator actuating a steering wheel control button 36, the steering wheel control button transmits a signal or code ("signal") to coil 38. The transmitted signal is communicated through the inductive link between coils 38 and 40. Coil 40 then provides the transmitted signal to the associated controller which then enables the vehicle operation corresponding to the actuated steering wheel control button 36. For instance, the controller enables the vehicle's radio horn, ventilation unit, etc., in response to the corresponding steering wheel control button 36 being actuated.

Figure 3:
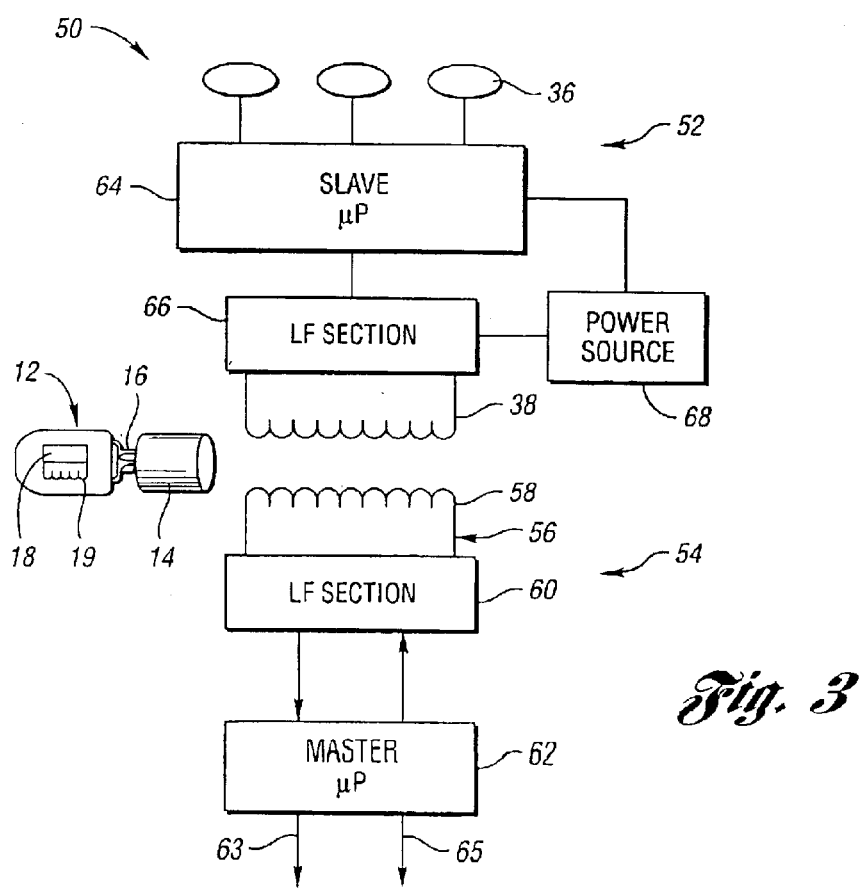
FIG. 3 illustrates a block diagram of the combined vehicle immobilizing and steering column control system in accordance with a first embodiment of the present invention.

Referring now to FIG. 3, with continual reference to FIGS. 1 and 2, a block diagram of a combined vehicle immobilizing and steering column control system 50 in accordance with a first embodiment of the present invention is shown. Combined system 50 generally includes an ignition key 12, a steering wheel sub-system 52, and a steering column sub-system 54. Key 12 includes a transceiver having transponder 18 for wirelessly transmitting an identification code and a receiver for receiving wireless signals. Steering wheel sub-system 52 generally includes a steering wheel 32 having a plurality of steering wheel buttons 36 which can be actuated by an operator to generate button control signals. Steering column sub-section 54 generally includes a vehicle immobilizing system 56 configured to not only read transponder 18 in key 12 but to also sense the actuation of steering wheel buttons 36 via a wireless communication link, i.e., receive the identification code and the button control signals via a contactless setup.

To this end, vehicle immobilizing system 56 includes an inductive coil 58 provided on a fixed steering shaft. Inductive coil 58 (i.e., the base station coil) is connected to a low frequency (LF) communications section 60. A master microprocessor 62, i.e., master controller, is connected to inductive coil 58 via LF section 60. Master controller 62 receives signals received by coil 58 via LF section 60 for processing. Such received signals include the identification code transmitted by transponder 18 of key 12 and the button control signals generated by steering wheel control buttons 36.

Likewise, master controller 62 may provide generated signals to coil 58 via LF section 60 in order to provide communications to key 12 and steering wheel control buttons 36. For instance, coil 58 wirelessly transmits signals generated by master controller 62 for reception by the receiver of key 12. Thus, key 12 and master controller 62 may communicate back and forth with one another via coil 58 of vehicle immobilizing system 56. Similarly, the components of steering wheel 32 and master controller 62 may communicate back and forth with one another via coils 38 and 58.

For vehicle immobilizing functions, coil 58 of immobilizing system 56 is configured to sense the identification code transmitted by transponder 18 of key 12 when the key is inserted into lock cylinder 14. Lock cylinder 14 is configured to be positioned adjacent to coil 58 in order to enable coil 58 to sense the identification code transmitted by transponder 18 when key 12 is inserted into the lock cylinder. Coil 58 provides the sensed identification code to LF section 60. LF section 60 demodulates the sensed identification code and then provides same to master controller 62. Master controller 62 then processes the sensed identification code to determine whether the sensed identification code is authorized. If so, master controller 62 outputs an immobilizing control signal 63 in order to deactivate the vehicle immobilizing system and thereby enable the vehicle engine upon key 12 being turned within lock cylinder 14.

For steering wheel control button functions, steering wheel sub-system 52 includes a slave micro-processor 64, i.e., slave controller, and an LF section 66. Coil 38 is positioned in a lower part of the steering wheel and is connected to LF section 66. Slave controller 64 and LF section 66 are powered by a rechargeable power source 68. Power source 68 may be a capacitor or a battery.

Upon actuation of a steering wheel control button 36, slave controller 64 transmits a corresponding control button signal to LF section 66. LF section 66 modulates the LF field from coil 58 with data from slave controller 64. The control button signal is inductively communicated from coil 38 of steering wheel sub-system 52 to coil 58 of immobilizing system 56. The control button signal received by coil 58 is then communicated to master controller 62 of steering column sub-section 54. Master controller 62 then outputs a control signal 65 in order to enable the vehicle function corresponding to the actuated steering wheel control button.

As such, vehicle immobilizing system 56 effectively has two function modes for serving two purposes: 1) performing typical vehicle immobilizing functions; and 2) performing steering wheel control button functions. Both purposes are accomplished by wirelessly sensing with one coil (i.e., coil 58 of immobilizing system 56) the identification code transmitted from transponder 18 of key 12 and the control button signals transmitted from coil 38 of steering wheel 32. All of the sensed codes and signals are processed by master controller 62. As a result, only one controller is needed to perform the vehicle immobilizing and steering wheel control button functions.

As a result of using an inductive or wireless link for sensing control button signals generated by steering wheel control buttons 36, combined system 50 eliminates the need for wires to be directly connected between steering shaft 34 and the steering wheel control buttons. The clock spring is thus effectively simplified. If any air bag squibs can be safely fired over this inductive link then the wired clock spring could be eliminated and effectively converted into a wireless clock spring. Further, as master controller 62 processes the sensed signals to perform both of the vehicle immobilizing and steering wheel control button functions the need for separate vehicle immobilizing and vehicle steering wheel control button modules is eliminated.

In addition to sensing identification codes transmitted by key 12, coil 58 of vehicle immobilizing system 56 may also sense identification codes and other signals transmitted by passive entry units and remote keyless entry units. For instance, coil 58 senses the identification code and other signals transmitted by a fob. Coil 58 provides the identification code transmitted by the fob to master controller 62 which authorizes the identification code for vehicle immobilization purposes as described above. Coil 58 provides the other signals transmitted by the fob to master controller 62 for the enablement of vehicle control functions typically associated with fobs. Master controller 62 may also transmit signals via coil 58 for receipt by such passive and remote keyless entry units.

Accordingly, vehicle immobilization system 56 provides a backup system for passive entry/passive go functions provided by a passive entry fob. To this end, if the battery power of the fob runs out then the operator only needs to move the fob near coil 58. For example, a receptacle for receiving the fob may be placed near coil 58. Coil 58 then senses a transponder signal stored in read out form in the fob. This transponder signal being a "passive go" signal. In response to receipt of the passive goal signal by master controller 62 via coil 58 the master controller enables the vehicle engine to be started.

As such, key 12 may be substituted with a passive entry unit or the like operable for transmitting identification signals. Key 12 may be operable to perform both remote keyless entry and vehicle immobilizing functions; or be a passive entry unit with LF backup capability.

Figure 4:
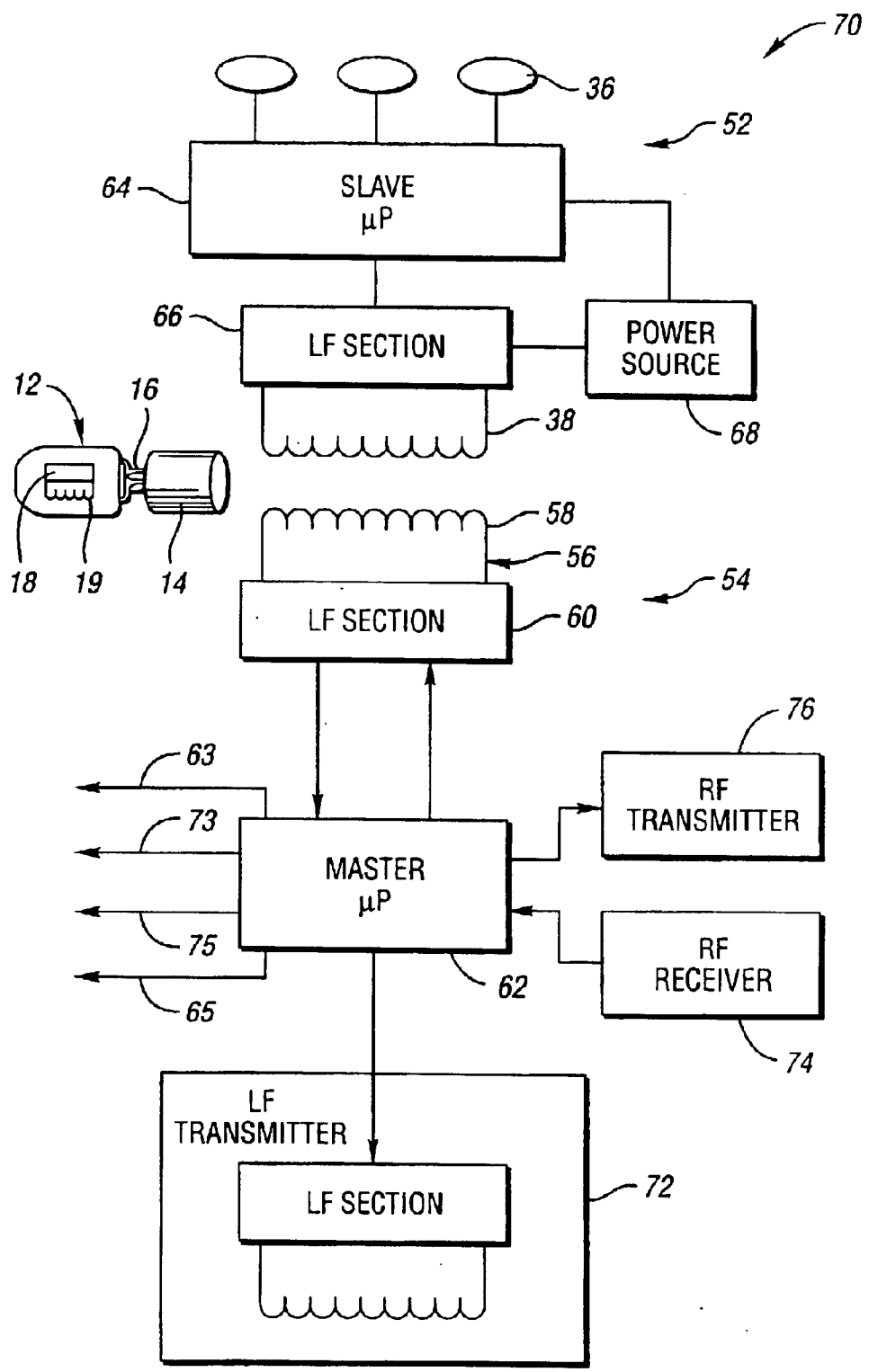
FIG. 4 illustrates a block diagram of the combined vehicle immobilizing and steering column control system in accordance with a second embodiment of the present invention.

Referring now to FIG. 4, with continual reference to FIGS. 1, 2, and 3, a block diagram of a combined vehicle immobilizing and steering column control system 70 in accordance with a second embodiment of the present invention is shown. Combined system 70 generally includes the same elements as combined system 50 and like elements are identified with the same reference numerals. Combined system 70 generally differs from combined system 50 by including additional elements for passive entry (PE), remote keyless entry (RKE), and tire pressure monitoring (TPM) applications.

Combined systems 50 and 70 are both operable with an ignition key or a passive entry identification unit such as key 12 having a transponder for transmitting an identification code for vehicle immobilizing functions. As described above, vehicle immobilizing system 56 receives the identification code transmitted by key transponder 18 to perform the vehicle immobilizing functions. Key 12 may include additional elements in order to have additional capabilities. For instance, key 12 may be a combination RKE and immobilizer; a passive entry unit with low frequency (LF) backup capability; and the like. As described below, combined system 70 includes additional components to accommodate such additional capabilities provided by key 12 and other components such as a fob and other passive entry devices.

For passive entry applications, combined system 70 includes an LF transmitter 72 for wirelessly transmitting LF wakeup signals to a passive entry device carried by the vehicle operator. Master controller 62 of immobilizing system 56 controls LF transmitter 72 to generate the wakeup signals. Of course, such LF wakeup signals generated by master controller 62 could be transmitted from coil 58 of vehicle immobilizing system 56 for receipt by the passive entry device.

As is known in the art, a passive entry device receiving a LF wakeup signal transmits a radio frequency (RF) signal in order to perform a mutual authentication process with master controller 62. As such, combined system 70 further includes a radio frequency (RF) receiver 74 and a RF transmitter 76. Both RF receiver 74 and RF transmitter 76 are connected to master controller 62 in order for the master controller to perform mutual authentication, i.e., handshaking, with the passive entry device. Upon proper authentication, master controller 62 outputs an appropriate control signal 73 in order to control the appropriate vehicle function such as opening the vehicle door locks.

RF receiver 74 is further operable to wirelessly receive remote keyless entry signals transmitted by remote keyless entry devices. Such signals received by RF receiver 74 are processed by master controller 62 of immobilizing system 56. Upon authenticating the received remote keyless entry signals, master controller 62 outputs the appropriate control signal 73 in order to control the appropriate vehicle function such as opening the vehicle door locks.

Likewise, RF receiver 74 is also operable to wirelessly receive tire pressure monitoring signals from tire sensors. Master controller of immobilizing system 56 processes such tire pressure signals received by RF receiver 74 in order to output a control signal 75 in order to perform the appropriate vehicle function such as generating an alarm message when the tire pressure is too low.

Thus, it is apparent that there has been providing in accordance with the present invention, a combined vehicle immobilizing and steering column control system that fully satisfies the object, advantages, and aims described above. While embodiments of the present invention have been illustrated and described, it is not intended that these embodiments illustrate and describe all possible forms of the invention. Rather, the words used in the specification are words of description rather than limitation, and it is understood that various changes may be made without departing from the spirit and scope of the present invention.

What is claimed is:

1. A combined immobilizing and steering column control system for a vehicle, the system comprising:

a portable device having a transponder for wirelessly transmitting an identification signal;

a steering wheel having controls and a first inductor, wherein the first inductor wirelessly transmits a control signal for controlling a vehicle function in response to a corresponding steering wheel control being actuated; and a vehicle immobilizing system having a second inductor and a controller, the second inductor being operable to wirelessly sense the identification signal transmitted by the transponder and to wirelessly sense a control signal transmitted by the first inductor, wherein the controller performs a vehicle immobilizing function in response to the second inductor sensing an identification signal transmitted by the transponder, wherein the controller enables the vehicle function corresponding to an actuated steering wheel control in response to the second inductor sensing the corresponding control signal transmitted by the first inductor.

2. The system of claim 1 wherein:
the device is an ignition key.

3. The system of claim 1 wherein:
the device is a passive entry device.

4. The system of claim 1 further comprising:
a fixed steering shaft, wherein the second inductor is positioned on the fixed steering shaft.

5. The system of claim 1 wherein:
the first and second inductors are coils.

6. The system of claim 2 further comprising:
a lock cylinder for receiving the ignition key, wherein the lock cylinder is positioned adjacent to the second inductor in order to enable the second inductor to sense the identification code transmitted by the transponder when the ignition key is inserted into the lock cylinder.

7. The system of claim 1 wherein:
the device has a receiver for receiving signals, wherein the receiver of the device senses signals transmitted by the vehicle immobilizing system via the second inductor.

8. The system of claim 1 wherein:
the vehicle immobilizing system further includes a transmitter connected to the controller to enable the controller to wirelessly transmit wake-up signals to the device.

9. The system of claim 8 wherein:
the vehicle immobilizing system further includes a transceiver connected to the controller to enable the controller to wirelessly receive and transmit authentication signals with the device, wherein upon authentication the controller enables a corresponding vehicle function.

10. The system of claim 1 wherein:
the vehicle immobilizing system further includes a receiver connected to the controller to enable the controller to wirelessly receive remote keyless entry signals transmitted by the device, wherein upon authentication of a received remote keyless entry signal the controller enables a corresponding vehicle function.

11. The system of claim 1 wherein:
the vehicle immobilizing system further includes a receiver connected to the controller to enable the controller to wirelessly receive remote tire pressure monitoring signals transmitted by a tire sensor, wherein the controller enables an alarm in response to a tire pressure monitoring signal being indicative of low tire pressure.

12. The system of claim 1 wherein:
the device is operable for transmitting a passive go signal as part of backup functionality for a passive go application upon the device having a dead battery, wherein the second inductor of the vehicle immobilizing system is operable for sensing the passive go signal transmitted by the device when the device is moved in proximate relation to the second inductor, wherein the controller performs a vehicle immobilizing function in response to the second inductor sensing the passive go signal.

13. The system of claim 1 wherein:
the device is operable for transmitting a keyless ignition system signal, wherein the second inductor of the vehicle immobilizing system is operable for sensing the keyless ignition system signal transmitted by the device, wherein the controller performs a vehicle immobilizing function in response to the second inductor sensing the keyless ignition system signal.

14. A combined immobilizing and steering column control system for a vehicle, the system comprising:
a portable key having a transponder for wirelessly transmitting an identification signal;
a steering wheel having controls and a first inductor, wherein the first inductor wirelessly transmits a control signal for controlling a vehicle function in response to a corresponding steering wheel control being actuated; and
a vehicle immobilizing system having a second inductor and a controller, the second inductor being operable to wirelessly sense the identification signal transmitted by the key transponder and to wirelessly sense a control signal transmitted by the first inductor, wherein the controller performs a vehicle immobilizing function in response to the second inductor sensing an identification signal transmitted by the key transponder, wherein the controller enables the vehicle function corresponding to an actuated steering wheel control in response to the second inductor sensing the corresponding control signal transmitted by the first inductor.

15. A combined immobilizing and steering column control system for a vehicle, the system comprising:
an ignition key system having a portable key and an ignition lock for installation in a vehicle, the key having a transponder for wirelessly transmitting an identification code when the key is inserted into the ignition lock;
a steering wheel having controls and a first inductor, the steering wheel being rotatably connected to a fixed steering shaft, wherein the first inductor wirelessly transmits a control signal for controlling a vehicle function in response to a corresponding steering wheel control being actuated; and
a vehicle immobilizing system having a second inductor and a controller, the second inductor being positioned on the fixed steering shaft and being adjacent to the ignition lock and the first inductor, the second inductor being operable to wirelessly sense the identification signal transmitted by the key transponder and to wirelessly sense a control signal transmitted by the first inductor, wherein the controller performs a vehicle immobilizing function in response to the second inductor sensing an identification signal transmitted by the key transponder, wherein the controller enables the vehicle function corresponding to an actuated steering wheel control in response to the second inductor sensing the corresponding control signal transmitted by the first inductor.

* * * * *